Figure 1:
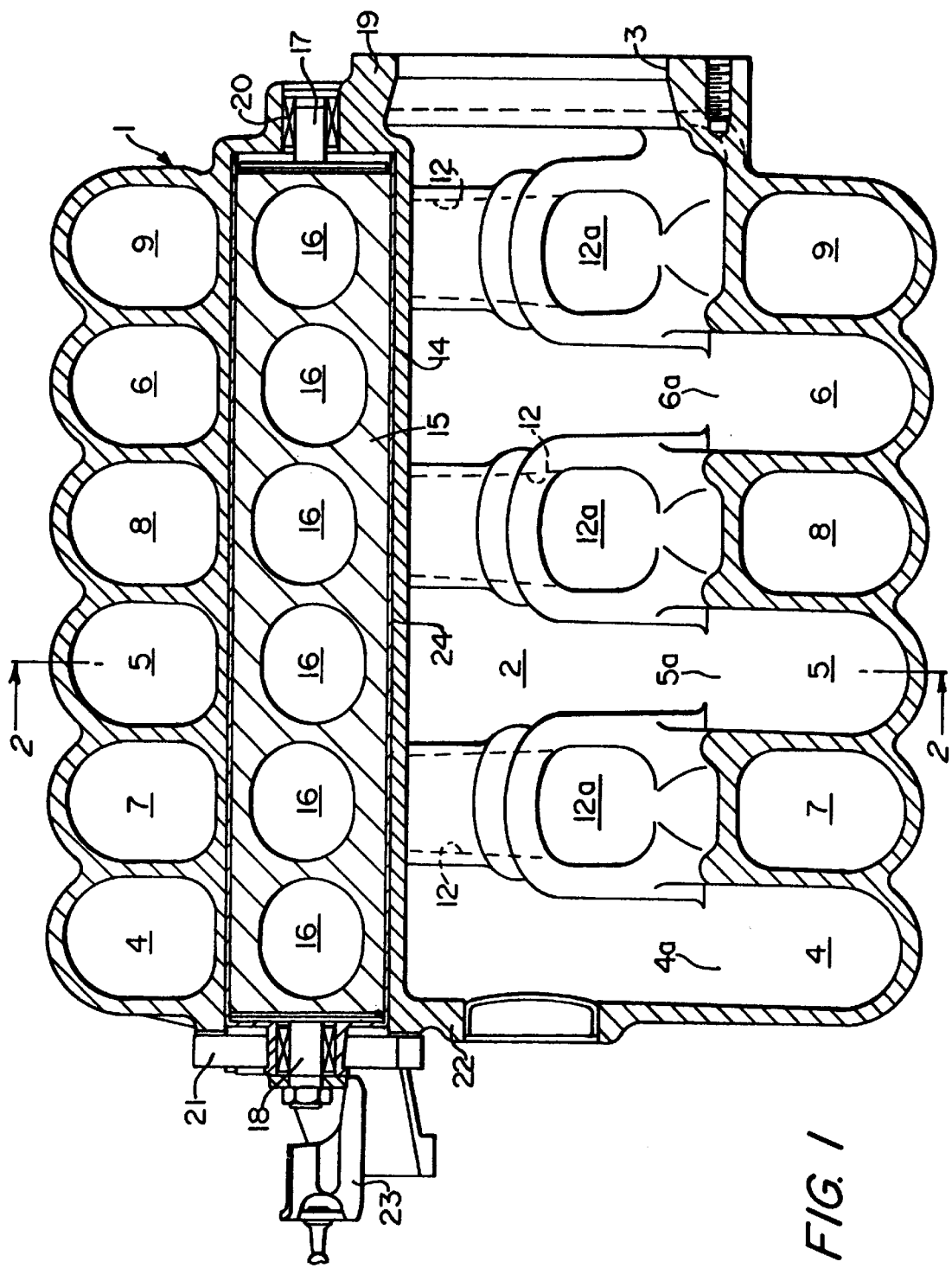

United States Patent
Ohrnberger et al.

[11] Patent Number: 5,901,677
[45] Date of Patent: May 11, 1999

[54] INLET PIPE SYSTEM FOR A MULTICYLINDER INTERNAL COMBUSTION ENGINE

[75] Inventors: Gerd Ohrnberger, Neudenau; Helmut Dillig, Bad Rappenau, both of Germany

[73] Assignee: Audi AG, Ingolstadt, Germany

[21] Appl. No.: 08/361,284

[22] Filed: Dec. 22, 1994

[30] Foreign Application Priority Data

Dec. 24, 1993 [DE] Germany ............... 43 44 504

[51] Int. Cl.$^6$ ....................................... F02B 75/22
[52] U.S. Cl. ....................... 123/184.31; 123/184.55
[58] Field of Search ................. 123/184.55, 184.53, 123/184.61, 184.56, 184.59, 184.52, 184.31, 184.34, 184.37, 184.44, 184.41, 184.42

[56] References Cited

U.S. PATENT DOCUMENTS

| | | | |
|---|---|---|---|
| 4,679,531 | 7/1987 | Hitomi et al. | 123/184.55 |
| 4,690,106 | 9/1987 | Nakayama et al. | 123/184.55 |
| 4,854,271 | 8/1989 | Miyano et al. | 123/184.31 |
| 4,919,086 | 4/1990 | Shillington | 123/184.61 |
| 4,932,369 | 6/1990 | Parr | 123/184.42 |
| 5,273,010 | 12/1993 | Elder | 123/184.61 |

FOREIGN PATENT DOCUMENTS 2202276  9/1988  United Kingdom ............. 123/184.53

*Primary Examiner*—Marguerite McMahon
*Attorney, Agent, or Firm*—Lalos & Keegan

[57] ABSTRACT

An inlet pipe system for a multicylinder internal combustion engine, especially with two rows of cylinders in a V-configuration, has a tubular inlet distributor 2, from which first individual inlet pipes 4 through 9 proceed which extend in an arc around the inlet distributor and which lead to the individual cylinders of the two rows of cylinders. Second, shorter individual inlet pipes 12 likewise proceed from the inlet distributor and discharge into the pertinent individual inlet pipes. The inlet distributor and the first and second individual inlet pipes are formed by a one-piece part 1 which has a longitudinal hole 14 which cuts the second individual inlet pipes 12 for the cylinders of the two rows of cylinders. Into longitudinal hole 14 a drum controller 15 is inserted which for each second individual inlet pipe 12 has an opening 16 which can be brought into alignment or out of alignment with the pertinent second individual inlet pipe by turning the drum controller 15.

5 Claims, 3 Drawing Sheets

INLET PIPE SYSTEM FOR A MULTICYLINDER INTERNAL COMBUSTION ENGINE

The invention relates to an inlet pipe system for a multicylinder internal combustion engine according to the preamble of claim 1.

An inlet pipe system of this type is known from U.S. Pat. No. 4,932,369. This inlet system consists of essentially two housing halves which are attached to one another. The second individual inlet pipes can be blocked or unblocked by a rotary drum. This known inlet pipe system is relatively expensive to produce.

The problem of the invention is to devise an inlet pipe system of the generic type which is characterized by a more simple structure and correspondingly more cost favorable production.

This problem is solved according to the invention by the features indicated in the characterizing part of claim 1.

Because the inlet distributor and the individual inlet pipes are formed by a one-piece part, production is simplified and mismatches, which are inevitable when two castings are joined due to production tolerances, are prevented. Because all swivel flaps have been replaced by a single drum controller, production becomes much cheaper. Since these drum controllers need to be inserted only into the longitudinal hole in the part which cuts the second individual inlet pipes, the expensive calibration work which is necessary in the known swivel flaps is eliminated.

The part which comprises the inlet distributor and the first and second individual inlet pipes consists preferably of plastic and with respect to low production costs preferably of an injection molded part. Since for its manufacture a multi-part mold is necessary with mold seams which extend transversely to the longitudinal direction of the longitudinal hole, a mismatch of the individual sections of the longitudinal hole to one another cannot be completely eliminated. After inserting the drum controller, between its outer surface and the wall of the longitudinal hole, gaps could then form which could result in the adjacent individual inlet pipes mutually influencing the intake process; this is undesirable. To prevent this the longitudinal hole can be lined with a pressed-in metal sleeve which is provided with openings which are aligned with the second individual inlet pipes. In this way the drum controller can be inserted with very small radial play. Mutual influence of intake processes in adjacent second individual inlet pipes is thus largely prevented. In addition to or instead of one such pressed-in sleeve, the drum controller between adjacent openings can have one peripheral groove at a time into which an externally tensioning piston ring is inserted which seals against the wall of the longitudinal hole or the wall of the sleeve and seals adjacent openings effectively against one another.

To reduce construction space it is feasible if the inlet distributor is tubular and the first individual inlet pipes extend in an arc over more than 270° around the inlet distributor and each second individual inlet pipe runs parallel to the pertinent first individual inlet pipe radially inside over a partial area of the latter and has a common wall with it and near the cylinder-side end of the first individual inlet pipe discharges into the latter. The longitudinal hole is thus arranged such that it cuts the second individual inlet pipes in the middle.

This design is especially advantageous for an internal combustion engine with two rows of cylinders in a V arrangement, the individual inlet pipes assigned to the cylinders of the first row of cylinders extending clockwise and the individual inlet pipes assigned to the cylinders of the second row of cylinders extending counterclockwise around the inlet distributor and in the longitudinal direction of the inlet distributor one first and second individual inlet pipe at a time for one cylinder of the first row of cylinders following a first and second individual inlet pipe for one cylinder of the second row of cylinders. In this case the second individual inlet pipes for the cylinders of the two rows of cylinders are controlled with a single drum controller.

One embodiment of the invention in the form of an inlet pipe system for a V-6 internal combustion engine is described in the following with reference to the drawings.

Figure 2:
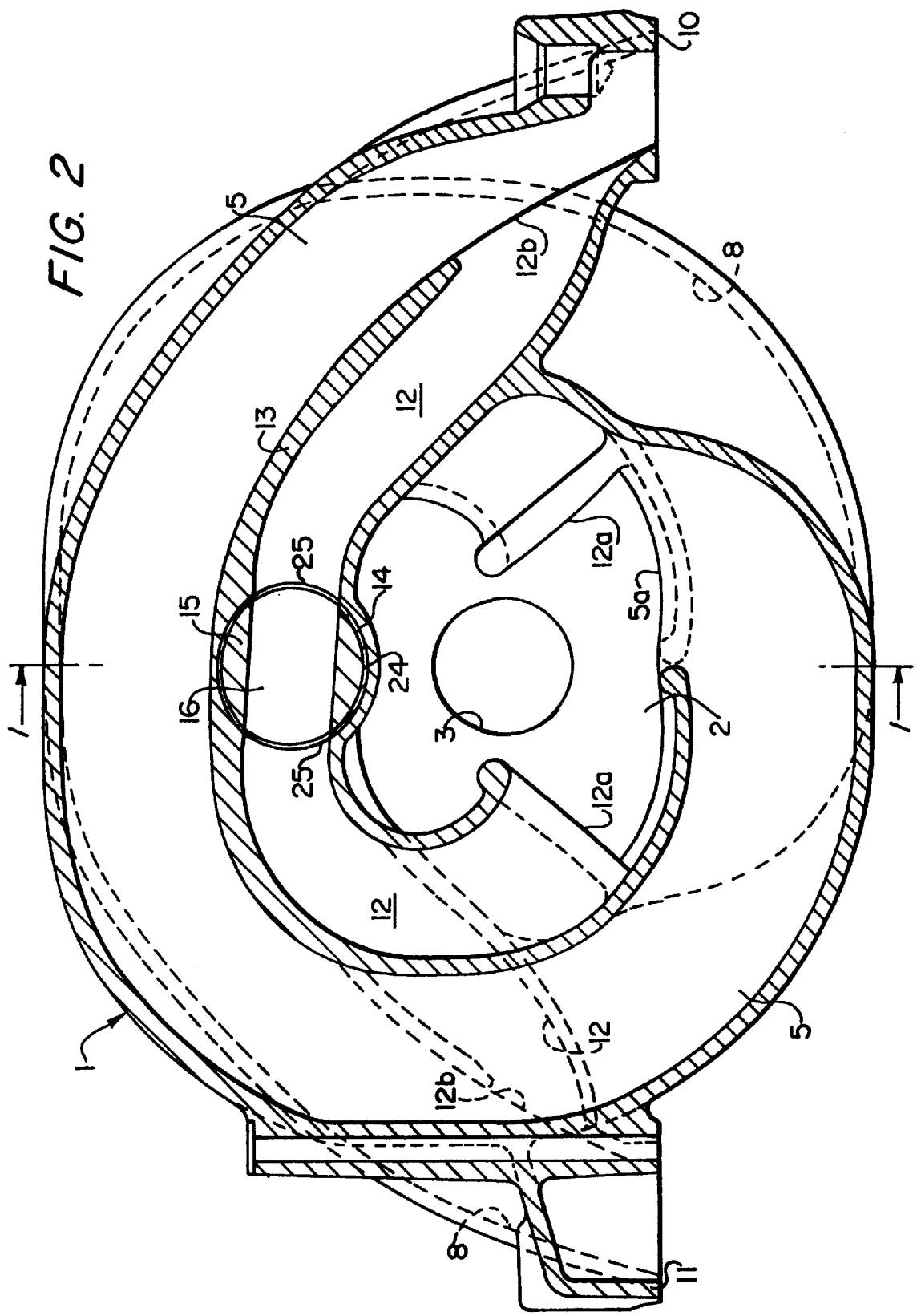
Figure 3:
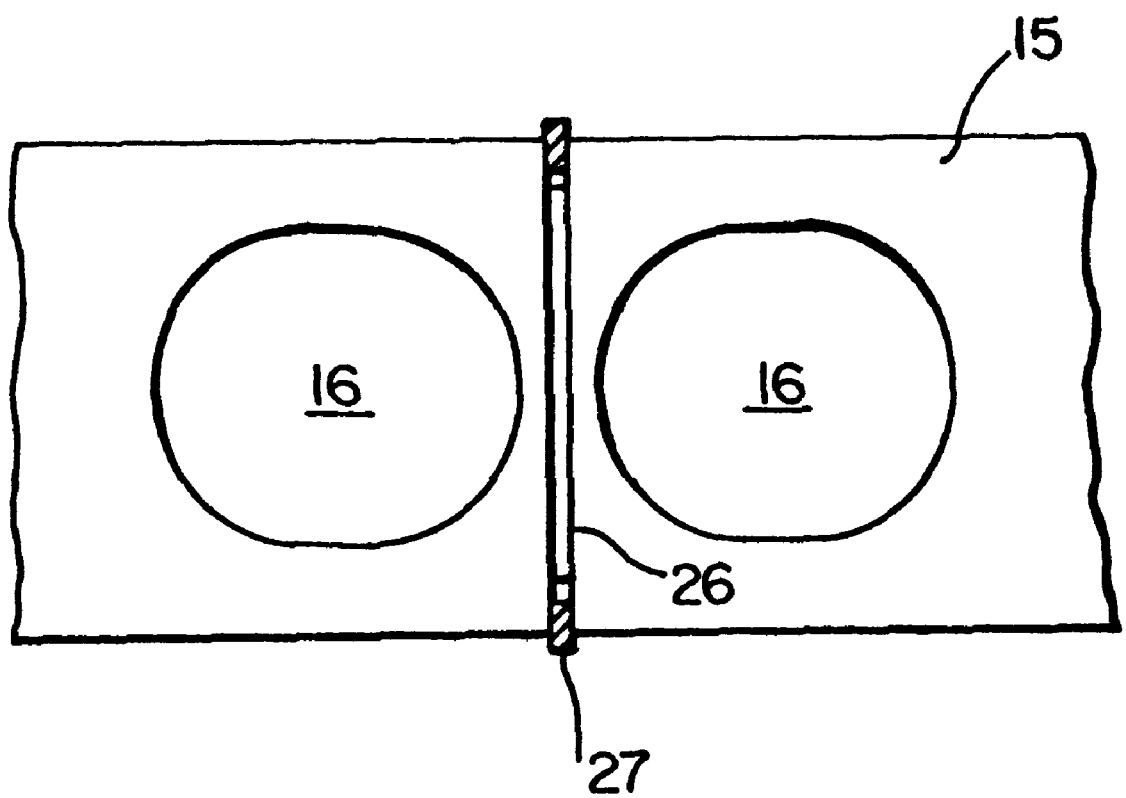

FIG. 1 shows a longitudinal section of the inlet pipe system along line 1—1 in FIG. 2, FIG. 2 shows a cross section along line 2—2 in FIG. 1, and FIG. 3 shows a partial view of the drum controller with piston rings.

The inlet pipe system shown in the drawings is intended for a V-6 internal combustion engine for arrangement between the rows of cylinders which each contain three cylinders. It has a one-piece plastic part 1 which contains a central, tubular inlet distributor 2 which is connected through an opening 3 in the wall of part 1 which is on the right in FIG. 1 to a throttle valve part which is not shown. First individual inlet pipes 4, 5, and 6 for the cylinders of the first row of cylinders and first individual inlet pipes 7, 8, and 9 for the cylinders of the second row of cylinders proceed alternatingly from inlet distributor 2. The first individual inlet pipes 4 through 9 are located next to one another and extend, as shown in FIG. 2, around inlet distributor 2, the first individual inlet pipes 4, 5 and 6 in FIG. 2 running clockwise and first individual inlet pipes 7, 8 and 9 running counterclockwise. The entry openings of first individual inlet pipes 4 through 6 are labelled 4a through 6a. The entry openings of the other first individual inlet pipes 7 through 9 are not visible. First individual inlet pipes 4 through 6 end in a flange 10 which is attached to the cylinder head of the first row of cylinders, and first individual inlet pipes 7, 8 and 9 end in a flange 11 which is screwed to the cylinder head of the other row of cylinders.

Radially within each first individual inlet pipe 4 through 9 is a short second individual inlet pipe 12 which likewise proceeds from the inlet distributor 2 with its entry opening labelled 12a and which discharges at 12b into the pertinent first individual inlet pipe, as shown in FIG. 2. Second individual inlet pipes 12 run parallel to the pertinent first individual inlet pipes and in the same direction as the latter and they have a common wall 13 with them.

Part 1 has longitudinal hole 14 which cuts all second individual inlet pipes 12; in the hole drum controller 15 is located which has an opening 16 for each second individual inlet pipe. The drum controller 15 is provided on its two ends with shaft ends 17 and 18, of which shaft end 17 which is on the right in FIG. 1 is supported in the right front wall 19 of part 1 via a needle sleeve 20 and the left shaft end 18 is supported in a flange 21 which is screwed to left front wall 22 of part 1. A lever 23 which is connected to an actuating device which is not shown, for example, a vacuum capsule, is attached to the left shaft end 18; with the vacuum capsule the drum controller 15 can be turned between the first position which unblocks second individual inlet pipes 12 and which is shown in FIG. 2, and a second position which blocks them.

To equalize possible mismatches of the wall of longitudinal hole 14 in the production of plastic part 1 in a multi-part mold, a metal sleeve 24 which has openings 25 which are aligned with the second individual inlet pipes 12 can be pressed into hole 14. This sleeve 24 can be used at the same time to reduce the friction of drum controller 15 if it consists of plastic.

With sleeve 24, as mentioned, mismatches of the wall of longitudinal hole 14 can be compensated, with which close running clearance for drum controller 15 can be implemented. Thus a connection between adjacent second individual inlet pipes is avoided which could lead to a disruption of intake processes. In addition to or instead of sleeve 15, as shown in FIG. 3, drum controller 15 can be provided between two adjacent openings 16 at a time with a peripheral groove 26 into which an externally tensioning piston ring 27 which seals against the wall of longitudinal hole 14 or against the inside wall of sleeve 24 is inserted. Insertion of the drum controller with the piston rings can be done using a mounting sleeve, as is fundamentally conventional in installation of pistons equipped with piston rings. This mounting sleeve is first inserted with drum controller 15 equipped with piston rings 27 into the longitudinal hole 14 and then removed. If necessary it can remain in the longitudinal hole and replace metal sleeve 24.

The invention is not limited to an inlet pipe system for an internal combustion engine with two rows of cylinders arranged in a V-configuration, but can also be used in an inlet pipe system for an internal combustion engine with only one row of cylinders. In this case of course a group of first individual inlet pipes 4, 5, 6 or 7, 8, 9 and the pertinent second individual inlet pipes are eliminated.

What is claimed is:

1. An inlet pipe system for a multicylinder internal combustion engine comprising:

an intake distributor;

individual first inlet pipes positioned side by side, issuing from said intake distributor, each extending to a cylinder, and ending in a flange connected to a cylinder row of said engine;

shorter second individual inlet pipes also issuing from the intake distributor, each extending to a cylinder, and ending at one of said flanges;

each of said second individual inlet pipes extending parallel and radially adjacent to said first individual inlet pipes, and a common wall therebetween; wherein certain of said individual first and second inlet pipes are assigned to cylinders of a first row of cylinders of said engine and extend clockwise around said intake distributor and certain of said individual first and second inlet pipes are assigned to a second row of cylinders and extend counterclockwise around said intake distributor;

a single drum controller rotatively arranged in a longitudinal hole intersecting each second individual inlet pipe, said drum controller having through-holes to open or close said second individual inlet pipes by rotation of said drum controller; and wherein said intake distributor and said first and second individual inlet pipes form a one-piece component.

2. An inlet pipe system as in claim 1, wherein said one-piece component is made of plastic, and wherein said longitudinal hole is lined with a pressed-in metal sleeve, said sleeve including openings that are aligned with said second individual inlet pipes.

3. An inlet pipe system as in claims 1 or 2 wherein said drum controller includes a peripheral groove located between adjacent ones of said through-holes, and an externally tensioned piston ring inserted into said peripheral groove to provide a seal.

4. An inlet pipe system as in claims 1 or 2 wherein said intake distributor is tubular, and said individual first inlet pipes extend in an arc over more than 270° around said intake distributor.

5. An inlet pipe system as in claims 1 or 2 wherein said longitudinal hole extends through the approximate center of said second individual inlet pipes.

\* \* \* \* \*

UNITED STATES PATENT AND TRADEMARK OFFICE
CERTIFICATE OF CORRECTION

PATENT NO. : 5,901,677
DATED : May 11, 1999
INVENTOR(S) : Ohrnberger et al.

page 1 of 4

It is certified that error appears in the above-identified patent and that said Letters Patent is hereby corrected as shown below:

In the Abstract:
  Line 3, after "distributor" delete "2"
  Line 4, after "proceed" insert --, and--
  Line 7, after "pipes" delete "12"
  Line 8, after "the" delete "pertinent" and insert --associated first--
  Line 10, after "part" delete "1"
  Line 11, after "hole" delete "14"
  Line 12, after "pipes" delete "12"
  Line 13, after "hole" delete "14" and after "controller" delete "15"
  Line 14, after "pipe" delete "12"
  Line 15, after "opening" delete "16"
  Line 16, after "the" delete "pertinent" and insert --associated--
  Line 17, after "controller" delete "15"

UNITED STATES PATENT AND TRADEMARK OFFICE
CERTIFICATE OF CORRECTION

PATENT NO. : 5,901,677
DATED : May 11, 1999
INVENTOR(S) : Ohrnberger et al.

It is certified that error appears in the above-identified patent and that said Letters Patent is hereby corrected as shown below:

Column 1, line 4
  Between title and first paragraph, insert --Field of the Invention-- as a subheading
  Paragraph 1
    lines 2 and 3, after "engine" delete "according to the preamble of claim 1"
  Between lines 7 and 8, insert --Background of the Invention-- as a subheading
  Paragraph 2
    line 2, after "4,932,369" delete ". This" and insert --, in which the--
  Between lines 13 and 14, insert --Summary of the Invention-- as a subheading
  Paragraph 3
    line 1, delete "The problem" and insert --An object--
    lines 3 and 4, after "correspondingly" delete "more cost favorable production" and insert --less costly to produce--
  Paragraph 4 delete in its entirety
  Paragraph 5
    line 1, delete "Because" and insert --In the present invention--
    line 2, after "part" delete "," and insert --.This--
    line 5, delete "Because" and insert --In the present inventton--
    line 6, after "Since" delete "these" and insert --the--
    line 7, after "controllers" insert --of the present invention--

UNITED STATES PATENT AND TRADEMARK OFFICE
CERTIFICATE OF CORRECTION

PATENT NO. : 5,901,677  
DATED : May 11, 1999  
INVENTOR(S) : Ohrnberger et al.

page 3 of 4

It is certified that error appears in the above-identified patent and that said Letters Patent is hereby corrected as shown below:

Column 2
 Line 3, after "distributor" delete "and in" and insert --. In--
 Line 5, after "cylinders" change "following" to --follows--
 Between lines 9 and 10, insert --Brief Description of the Drawings-- as a subheading
 Between lines 18 and 19, insert --Detailed Description-- as a subheading
 Line 51, after "12" delete "; in" and insert --.In-- and after "hole" insert --,--

UNITED STATES PATENT AND TRADEMARK OFFICE
CERTIFICATE OF CORRECTION

PATENT NO. : 5,901,677
DATED : May 11, 1999
INVENTOR(S) : Ohrnberger et al.

It is certified that error appears in the above-identified patent and that said Letters Patent is hereby corrected as shown below:

Column 3
  Line 11, After "provided" insert --with peripheral grooves 26 each--
  Line 12, after "16" insert --.-- and delete "at a time with a peripheral groove 26 into which"
  Line 13, after "which" delete "an" and insert --A--, change "tensioning" to --tensioned-- and insert --,-- after "27"
  Line 15, after "24" insert --,-- and after "inserted" insert --into each groove 26--
  Line 17, after "is" delete "fundamentally"
  Line 28, after "the" delete "pertinent" and insert --associated--

Signed and Sealed this

Second Day of January, 2001

Attest:

Attesting Officer

Q. TODD DICKINSON
Commissioner of Patents and Trademarks